E. SCHNEIDER.
APPARATUS FOR CHECKING THE LIQUID CHARGE AND AIR PRESSURE IN RECUPERATORS OF GUNS.
APPLICATION FILED MAY 31, 1917.
1,318,013.
Patented Oct. 7, 1919.
4 SHEETS—SHEET 1.
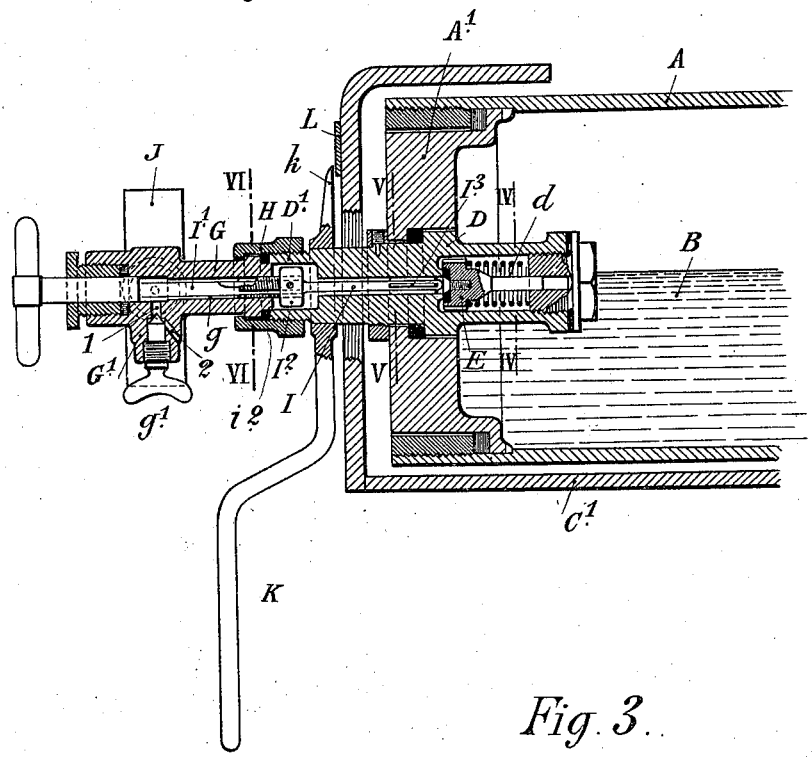
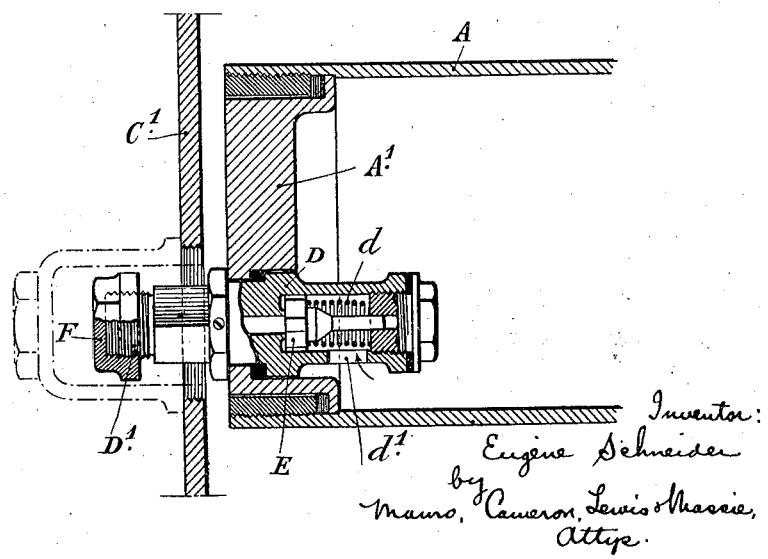

E. SCHNEIDER.
APPARATUS FOR CHECKING THE LIQUID CHARGE AND AIR PRESSURE IN RECUPERATORS OF GUNS.
APPLICATION FILED MAY 31, 1917.

1,318,013.

Patented Oct. 7, 1919.
4 SHEETS—SHEET 2.

Inventor:
Eugène Schneider
by
Mauro. Cameron. Lewis & Massie.
Attys.

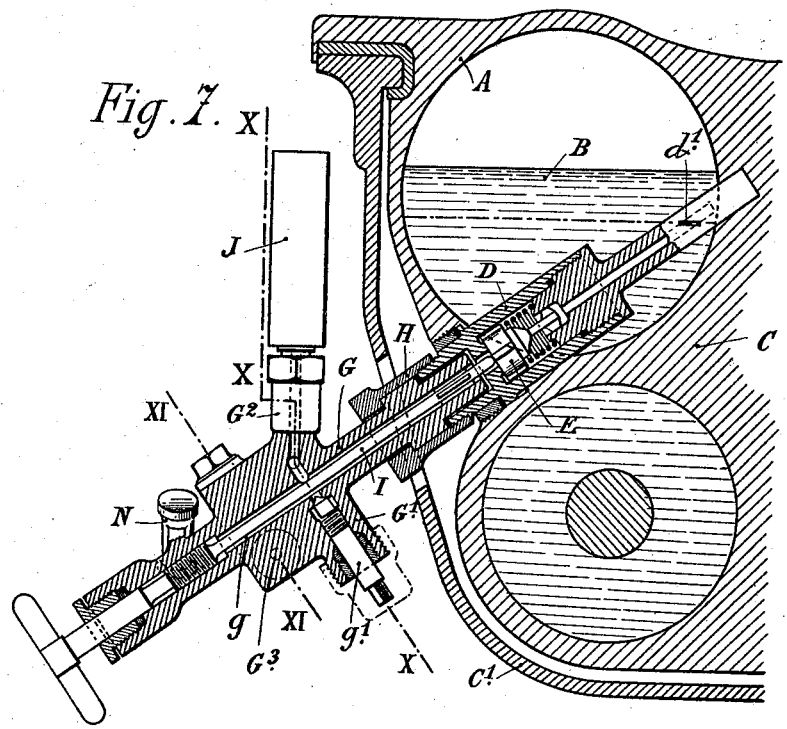
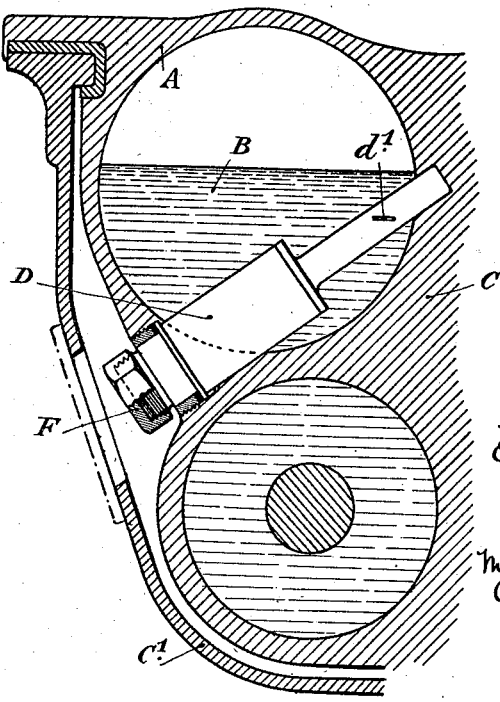

E. SCHNEIDER.
APPARATUS FOR CHECKING THE LIQUID CHARGE AND AIR PRESSURE IN RECUPERATORS OF GUNS.
APPLICATION FILED MAY 31, 1917.
1,318,013.
Patented Oct. 7, 1919.
4 SHEETS—SHEET 4.
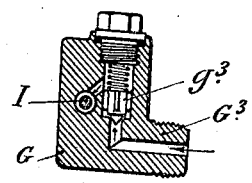
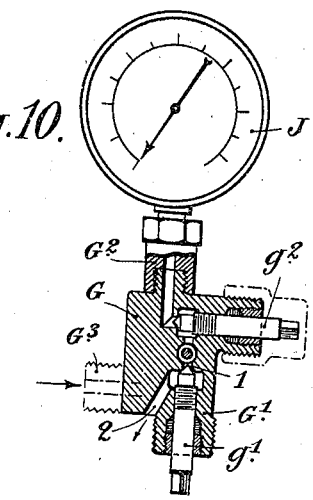
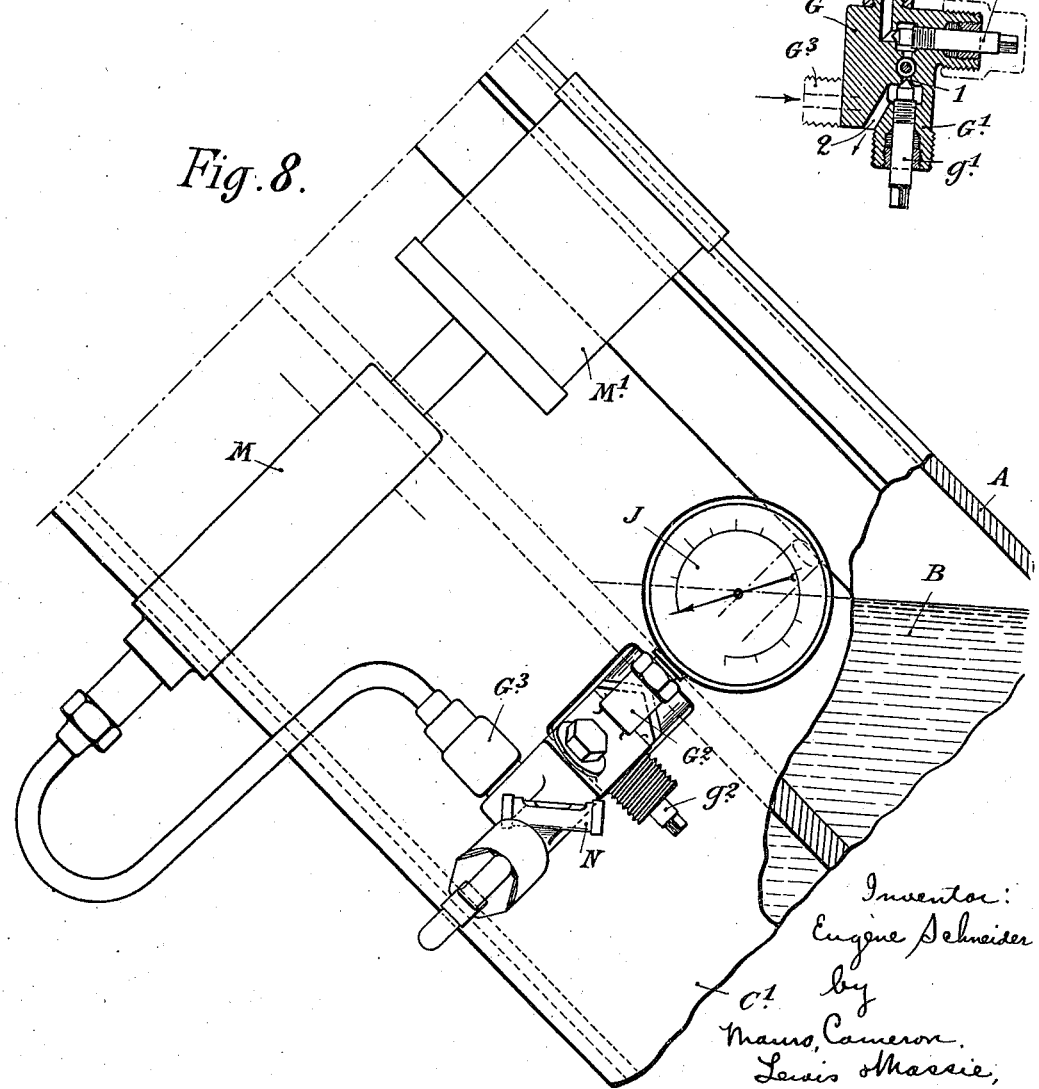

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

APPARATUS FOR CHECKING THE LIQUID CHARGE AND AIR-PRESSURE IN RECUPERATORS OF GUNS.

1,318,013.      Specification of Letters Patent.      Patented Oct. 7, 1919.

Application filed May 31, 1917. Serial No. 172,014.

*To all whom it may concern:*

Be it known that I, EUGÈNE SCHNEIDER, a citizen of the French Republic, residing at Le Creuzot, Saône-et-Loire, France, have invented a new and useful Improved Apparatus for Checking the Liquid Charge and Air-Pressure in Recuperators of Guns, which is fully set forth in the following specification.

When the liquid charge of a hydro-pneumatic recuperator falls below a determined level, the result is an insufficient pressure upon the air confined above the said charge, and consequently a defective working of the recuperator.

A fall of pressure may also take place without loss of liquid.

In the case of urgent firing, the normal pressure conditions may be restored rapidly without restoring the desired level of the liquid. But it is preferred each time that the circumstances will allow to have an exact restoration of the level of the liquid.

This invention has now for its object to provide an improved apparatus for checking the liquid charge and the air pressure, for use with guns where it is not possible, or it is not desired to provide a part movable through a packing, for the purpose of indicating at all times by its position the state of the liquid charge.

The invention consists substantially of a socket composed of two elements: one element mounted permanently on the recuperator cylinder comprises a chamber whose communication with the outside is normally closed by an inwardly opening spring valve. The wall of this chamber is formed with a slot or orifice situated at the height of the normal level of the liquid for a determined inclination of the gun barrel. The pipe or passage establishing communication between this socket element and the atmosphere, is normally closed by a cap plug, and on removing this plug, the removable supplementary socket element can be fitted to the said passage for the purpose of effecting the operations for checking and restoring normal conditions. The said removable supplementary socket element contains an axial passage for communicating with the fixed element and into it there open: a pipe neck for a duct for drawing off the liquid, another pipe neck for connecting with a pressure gage, and if desired a third pipe neck for connecting with a device for forcing in fresh liquid. The axial passage serves as a guide for a spindle for opening the valve which closes the fixed socket.

The manner in which this invention is to be performed will now be more particularly described with reference to the accompanying drawings which illustrate by way of example some practical constructions of apparatus according to this invention.

In these drawings:

Figure 1 is a vertical longitudinal section showing the two elements of the checking apparatus mounted in position for effecting the operation of checking and restoring normal conditions of the liquid charge and the air pressure.

Fig. 3 is a central horizontal sectional view taken through Fig. 1 showing the socket element fixed permanently on the recuperator cylinder; the removable element having been removed.

Fig. 7 is an axial section of the checking apparatus.

Fig. 8 is a side elevation thereof.

Fig. 9 is a cross section showing in elevation the element permanently fixed on the recuperator.

Figs. 10 and 11 are cross sections respectively on the lines X—X and XI—XI of Fig. 7.

In all these figures, A is one of the reservoirs of a hydro-pneumatic recuperator, wherein the gas is confined above the liquid charge B; $C^1$ is the sliding part of the gun with which the recuperator cylinders recoil.

The improved checking apparatus comprises an element fixed permanently on the recuperator. This element comprises a valve casing D immersed in the liquid charge at one end and projecting out of the said liquid at its other end.

In this socket there is formed a chamber $d$, the communication between which and the outside is normally closed by a spring valve E. The wall of the chamber has formed in it a slot or hole $d^1$.

On the pipe neck $D^1$ formed on that portion of the valve casing D that projects to the outside, there is screwed normally a screw cap F.

In the construction shown in Figs. 1 to 6, the valve casing D which is fixed permanently on the recuperator cylinder, is arranged in the forward end $A^1$ of the cylinder A, and as near as possible to the longitudinal axis of the gun.

The longitudinal axis of the casing D is parallel to the axis of the cylinder A and is at a level slightly lower than the normal level of the liquid B when the axis of the gun barrel is horizontal.

The removable element G of the improved checking apparatus, is adapted to fit the pipe neck $D^1$ by means of a union H after the screw cap F has previously been removed. I is a spindle which is adapted to be pushed through the longitudinal passage $g$ of the element G, for the purpose of forcing the valve E off its seat.

Figure 6:
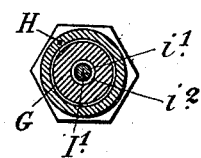

The rod $I^1$ for operating the spindle I may be screwed in and out by means of screw-threaded surfaces $i^1$ between which are formed grooves $i^2$ (Fig. 6). These surfaces are adapted to work in a corresponding screw-thread tapped in the passage $g$. $I^2$ is a stop for limiting the outward movement of the spindle and rod I—$I^1$.

The socket element G comprises a first pipe neck $G^1$ wherein there engages a closing plug $g^1$ which allows of opening and closing at will a discharge passage 1. A second pipe neck $G^2$ carries a union for connecting with a pressure gage J.

Upon the projecting portion of the element D there is fixed or mounted for the purpose of effecting the checking operations, a lever K provided with an indicating hand $k$ adapted to move over a scale L formed on or fixed to the slide $C^1$.

Figure 5:
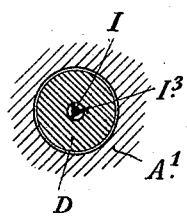

The sectional figure, Fig. 5, shows the cross section of the valve-opening spindle I which is formed at this place with guide ribs $I^3$.

Figure 2:
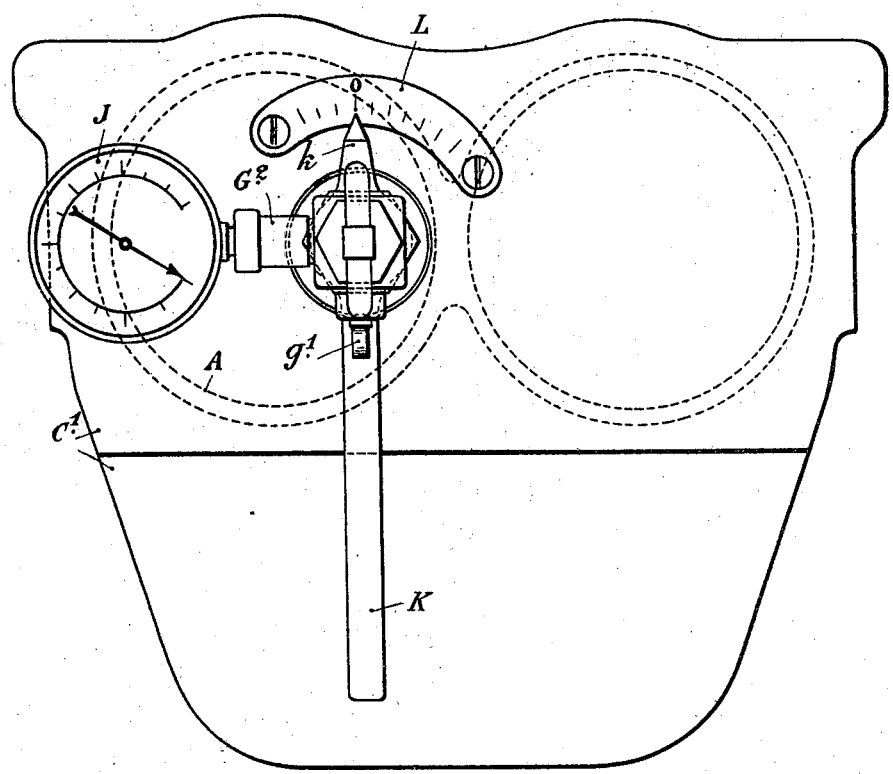
Fig. 2 is an end view thereof.
Figure 4:
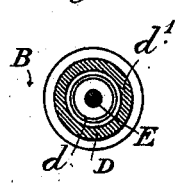
Figs. 4, 5 and 6 are cross sections respectively on the line IV—IV, V—V and VI—VI of Fig. 1.

For the purpose of checking the liquid charge and the air pressure by means of the just described construction of the improved apparatus, the procedure is as follows:

The gun barrel is brought into a horizontal position, as shown in Figs. 1 and 2. The screw cap F is assumed to be removed, and the union H with the removable element G is assumed to be placed in position after the lever K—$k$ has been first slipped into its place.

By operating the spindle I, the valve E is forced off its seat. Communication is then established with the pressure gage J which indicates the pressure of the air above the liquid B.

As above stated, in cases where the pressure is insufficient, and if it is a matter of urgency, the desired pressure may be restored without checking the state of the liquid charge.

If, on the contrary, it is desired to check the state of the charge, it is merely necessary by operating the closing plug $g^1$, to open the communication of the passage 1 with the outside. The communication slot $d^1$ is moved as desired by operating the lever K.

When the lever K is in its vertical position, the indicating hand $k$ will be opposite the zero mark of the scale L, which corresponds to the level of the normal charge.

If, in this position, liquid flows out from the passage 1 through the side passage 2, it is clear that the charge is sufficient at least.

The charge may however be in excess, and in such a case the lever K is moved toward the left until liquid no longer flows out. The scale is so made that the hand $k$ will then indicate exactly the quantity of liquid in excess.

If, on the contrary, the lever K being vertical, no liquid flows out through the passages 1 and 2, the said lever is moved to the right until liquid begins to flow out. Then the reading of the scale at the mark opposite which the hand $k$ has stopped, shows the amount of liquid which should be added in order to restore the liquid charge to its normal level.

In the construction shown in Figs. 7 to 11, the checking apparatus instead of being mounted in the end of the recuperator cylinder A, is mounted at a point of its longitudinal surface in a plane at right angles to the axis of the cylinder situated approximately at half length of the said cylinder. This position is chosen in all cases so that the slot $d^1$ for admitting liquid into the chamber $d$ of the fixed element D, shall be situated at the height of the free level of the liquid B when this level is normal, when the gun has been brought to a determined angle of elevation, preferably equal to or approximating its maximum elevation.

As in the preceding construction, the removable element G comprises also in this construction, a pipe neck $G^1$ for receiving a closing screw plug $g^1$ and for serving to discharge liquid through the passages 1 and 2, during the operation of checking the level. The removable element G also comprises a second pipe neck $G^2$ for connecting with the pressure gage J.

Owing to the position of the checking apparatus, communication with the pressure gage must be capable of being opened or closed at will; this is done by means of a screw plug $g^2$ (Fig. 10).

The element comprises a third pipe neck $G^3$ to which is connected a passage for communicating with a pump M for delivering fresh liquid drawn from a reservoir M¹. The pipe neck G³ contains a non-return valve g³ (Fig. 11).

The element comprises also a spirit level N attached to it in a fixed position which is determined by the fact that the air bubble is situated between its limit marks when the gun barrel has been elevated to the determined angle chosen for effecting the checking operations (Fig. 8).

The construction which has been just described has the great advantage of reducing considerably the free surface of the level of the liquid at the point where the latter is admitted into the apparatus at the moment of effecting the checking operation. The result is that for a lowering of the level due to the drawing-off of liquid, the capacity of the drawn-off liquid is considerably smaller, thereby increasing the exactness of the readings.

Having now described my invention, what I claim as new and desire to secure by Letters Patent is:

1. In apparatus for checking the liquid charge and air pressure in recuperators for guns, a recuperator chamber adapted to contain a liquid under gas pressure and to be inclined with the gun, a valve casing supported in the wall of said chamber and having a slot opening into the recuperator chamber and positioned to determine the normal level of liquid therein for a given inclination of the gun, said casing having a tubular portion opening outside the chamber, a valve in said casing subject to yielding pressure and normally closing communication between said casing and said tubular extension, and a removable conduit connection adapted to be coupled to said tubular portion and provided with an independently operated spindle for acting on said valve to open the same against said yielding pressure.

2. An apparatus as claimed in claim 1 wherein said valve casing is adapted for angular movement about its own axis to bring said liquid-level determining orifice to different levels.

3. An apparatus as claimed in claims 1 and 2 in combination with a scale indicating the level of the liquid in said cylinder above and below a predetermined level, and a lever adapted to rotate said valve casing and provided with a hand moving over said scale.

In testimony whereof I have signed this specification in the presence of two subscribing witnesses.

EUGÈNE SCHNEIDER.

Witnesses:
 CHAS. P. PRESSLY,
 ANDRÈ MOSTICKER.